United States Patent

Mattson et al.

[11] Patent Number: 4,726,118
[45] Date of Patent: Feb. 23, 1988

[54] HANDLE AND SKID ASSEMBLY FOR A CHAIN SAW

[76] Inventors: Ronald Mattson, 27520 W. Ingram Island Rd., Monroe, Oreg. 97456; Edward C. Montgomery, 1075 Ivy St., Junction City, Oreg. 97448

[21] Appl. No.: 23,729
[22] Filed: Mar. 9, 1987
[51] Int. Cl.[4] .......................... B27B 17/00
[52] U.S. Cl. .......................... 30/371; 30/379; 30/381; 83/745; 144/1 E
[58] Field of Search .......... 144/1 E, 1 F, 1 D; 30/383, 371, 379, 382; 83/745

[56] References Cited

U.S. PATENT DOCUMENTS

| | | | |
|---|---|---|---|
| 3,931,676 | 1/1976 | Merk | 30/371 |
| 4,048,722 | 9/1977 | Howard | 30/371 |
| 4,270,272 | 6/1981 | Graham | 30/371 |

Primary Examiner—W. Donald Bray
Attorney, Agent, or Firm—James D. Givnan, Jr.

[57] ABSTRACT

A handle and skid assembly for attachment to the saw bar of a chain saw. A handle component extends upwardly and rearwardly from the skid assembly and includes a pair of handgrips. The ground engaging skid assembly includes forwardly directed arms with one having an article engaging edge which guides the saw chain diagonally into cutting engagement with the article. An open area defined by the remaining arm receives a portion of the sawed article. The two-piece skid assembly includes protective flanges adjacent the runs of the saw chain.

8 Claims, 6 Drawing Figures

U.S. Patent
Feb. 23, 1988
4,726,118
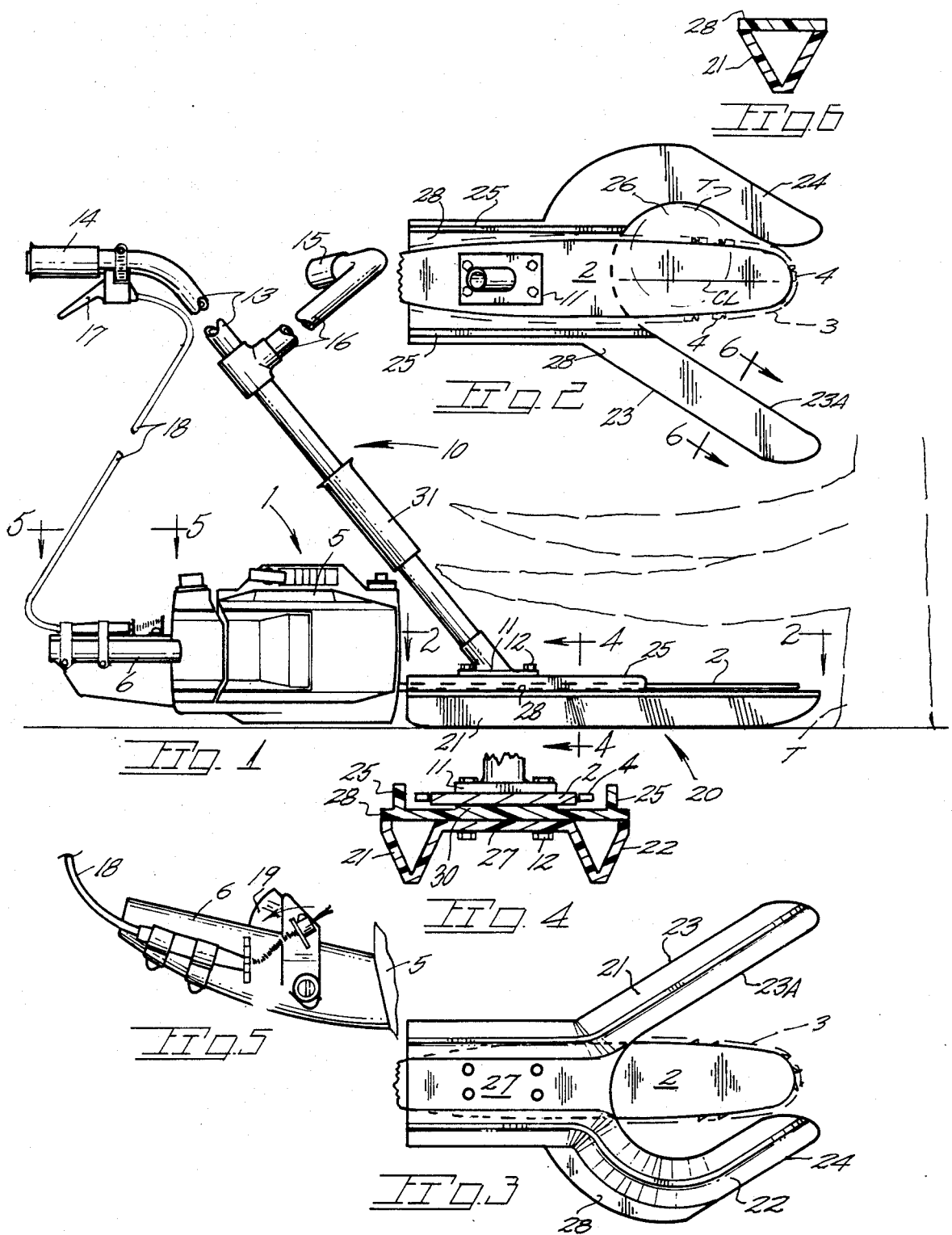

HANDLE AND SKID ASSEMBLY FOR A CHAIN SAW

BACKGROUND OF THE INVENTION

The present invention concerns generally chain saws for the cutting of small trees and brush.

A problem exists in the cutting of small trees, such as Christmas trees, close to ground level. This is particularly a problem to tree growers where, during harvesting, hundreds of trees must be cut during a work day. As the foilage of such trees is several feet in diameter at their base, access to the tree trunk is usually obstructed as well as the trunk being obscured. Over a work period of several hours the efficiency of a worker is severely reduced by reasons of fatigue and obstructed access to the tree trunk. Existing chain saws with extended saw blades are unsuitable because of their weight being bourne entirely by the operator.

U.S. Pat. Nos. 3,680,607; 3,931,676 and 4,317,285 all show saw bar attached appendages for the purposes of controlling engagement between the saw chain and article being cut. U.S. Pat. No. 3,931,676 is of additional interest for the reason that bar attached arms elevate the saw bar from a ground surface.

SUMMARY OF THE PRESENT INVENTION

The present invention is embodied in the combination of a powered saw with a handle and skid assembly.

The present handle extends upwardly and rearwardly from a mount on a saw bar for grasping by both of the operator's hands at spaced apart locations. In place on the underside of the horizontally disposed saw bar of the chain saw is a skid structure which positions the saw bar parallel and proximate the ground surface. An appendage assures guidance of the saw into desired cutting contact with the tree or item being cut. The skid structure serves to support the chain saw and saw bar at the desired height above the ground for optimum severance of the tree trunk at or very near the ground surface. A guard arm isolates the chain from accidental contact with the operator or other objects.

Important objectives include the provision of a chain saw attachment which greatly enhances saw use for high volume cutting of trees at or near ground level; the provision of a chain saw attachment of light weight and compatible with the several makes of existing chain saws without modification of same other than for drilling of the saw bar which permits convenient return of the chain saw to its original configuration for other uses; the provision of a low cost chain saw attachment enhancing the saws range of uses and which attachment the user may add to the saw without costly saw shop effort; the provision of a guide assembly for a chain saw with asymmetrical arms to assure cutting contact and severance of the article being cut.

BRIEF DESCRIPTION OF THE DRAWING

In the accompanying drawing:

FIG. 1 is a side elevational view of the present handle and skid assembly in place on a chain saw;

FIG. 2 is a horizontal sectional view taken along line 2—2 of FIG. 1;

FIG. 3 is a bottom plan view of FIG. 2;

FIG. 4 is a vertical sectional view taken along line 4—4 of FIG. 1;

FIG. 5 is a horizontal sectional view taken along line 5—5 of FIG. 1; and

FIG. 6 is a vertical sectional view taken along line 6—6 of FIG. 2.

DETAILED DESCRIPTION OF THE PREFERRED EMBODIMENTS

With continuing attention to the drawings wherein applied reference numerals indicate parts similarly hereinafter identified, the reference numeral 1 indicates generally a chain saw in wide use today and having a saw bar 2, an endless chain 3 entrained for travel about the blade perimeter and having a spaced apart cutter teeth 4. Such saws include a small displacement engine 5 and a fuel tank. A saw handle at 6 may be left in place as it does not conflict with the following described handle and skid assembly. A saw handle normally extending above the engine 5 is removed.

A handle assembly of the present invention is indicated generally at 10 and includes a base plate 11 mounted in place on the saw bar by fastener assemblies 12. A handle 13 is inclined upwardly and rearwardly and has a handgrip 14 while a second handgrip 15 is at the end of branch or right angular handle extension 16. A throttle 17 on the handle is coupled to a flexible cable 18 which terminates downwardly in attachment to the saw motor throttle 19 as seen in FIG. 5.

A skid assembly is indicated generally at 20 and attached to the underside of the saw bar and includes skids at 21-22. An appendage at 23 of the skid assembly projects outwardly from the saw bar and has a saw guiding edge 23A. A guard arm is at 24. Flanges 25 along the upper side of the skid assembly act as barriers to prevent accidental contact of the chain teeth with the user.

It has been determined that optimum cutting action on small trees may be achieved by disposing guide edge 23A at an included angle with the saw bar centerline CL of approximately 30 degrees.

Guard arm 24 defines an open area 26 for the reception of the sawn article such as a tree trunk T as the saw moves in a diagonal manner during a cutting operation.

To conserve weight and enhance mobility of the present assembly, it has been found desirable to construct the skid assembly 20 in a molded two-piece manner with the skids 21 and 22 joined by a web 27. An upper member 28 of the skid assembly carries the aforementioned flanges 25 and additionally includes a raised central portion 30 which serves to elevate saw plate 2 in place thereon to provide clearance for saw teeth 3 and member 28. Alternatively, manufacture of the skid assembly 20 may be of one-piece construction if desired to best suit the objectives at hand.

An auxiliary handgrip at 31 is provided at the combined center of gravity of the chain saw and skid assembly to enable convenient lifting and carrying of the combination from one cutting site to the next. In certain instances it may, of course, be desirable to drag or push the skid assembly and chain saw between successive cutting operations.

In use, the operator propels the chain saw and skid assembly beneath the tree or other article being cut per FIG. 1 with arm edge 23A contacting the article to cause saw bar engagement along a diagonal horizontal course inclined to the saw bar centerline. Relatively large trees may be cut as open area 26 of appendage 24 receives the sawn portion of the tree to the extent the cutting run of the saw chain 3 (i.e., the lowermost run in FIG. 2) may pass entirely through the tree.

Cutting is precisely regulated as the cutting is preferably done on the outward moving run of the saw chain with no risk of binding of the saw chain with the article being cut and the latter with arm edge 23A.

The present assembly greatly reduces stress on the saw operator's back and hence the risk of injury and resultant medical expenses. Further the guard appendage 24 and flanges 25 prevent any contact of the person with the saw chain.

In the event the chain saw is to be returned to its original configuration, the user simply removes handle assembly 10 and disconnects throttle control cable 18 from the saw throttle 19. An elevated saw handle (not shown) is re-attached to the saw motor housing.

While we have shown but one embodiment of the invention, it will be apparent to those skilled in the art that the invention may be embodied still otherwise without departing from the spirit and scope of the invention.

Having thus described the invention, what is desired to be secured in a Letters Patent is:

1. In combination,
   a chain saw having an elongate horizontal saw bar with a continuous cutting element passing thereabout,
   a handle assembly including a base plate, means attaching the base plate to the saw bar, and
   a skid assembly on the underside of said saw bar for sliding contact with the ground and on which is supported the chain saw during a sawing operation, said skid assembly including arm means with an edge surface offset from and serving to guide the cutting element into contact with the article being cut as the chain saw is advanced along a ground surface.

2. The combination claimed in claim 1 wherein said skid assembly includes a guard offset from said saw bar to prevent accidental contact with the cutting element.

3. The combination claimed in claim 2 wherein said guard is offset in an irregular manner from said saw bar to define an area for reception of the sawed article.

4. An attachment for a chain saw having an elongate saw bar about which a continuous cutting element is driven, said attachment comprising,
   a handle assembly, mounting means for attaching the handle assembly to the saw bar, and
   a skid assembly for attachment to the underside of the saw bar, said skid assembly including a guide appendage having an edge surface for contact with the article being cut to guide the chain saw into cutting contact with the article, skid means depending from the skid assembly.

5. The attachment claimed in claim 4 wherein said skid assembly additionally includes a guard appendage.

6. The attachment claimed in claim 5 wherein said guard appendage defines an open area within which is received the sawn portion of the article being cut.

7. The attachment claimed in claim 4 wherein said skid assembly is of molded two-piece construction for purposes of weight reduction.

8. The attachment claimed in claim 7 wherein said skid means comprise skids on said guide appendage and said guard appendage.

* * * * *